United States Patent [19]
Finley

[11] Patent Number: 6,068,091
[45] Date of Patent: May 30, 2000

[54] EXTERNALLY MOUNTED BRACKET SYSTEM FOR DISC BRAKES

[76] Inventor: George Finley, 6687 Kinzie Creek Pl., Casper, Wyo. 82604

[21] Appl. No.: 08/997,955

[22] Filed: Dec. 24, 1997

[51] Int. Cl.$^7$ ............................. F16D 55/00; B61H 13/00
[52] U.S. Cl. ..................... 188/73.31; 188/71.1; 188/58
[58] Field of Search ............................. 188/73.31, 73.1, 188/71.1, 58

[56] References Cited

U.S. PATENT DOCUMENTS

| | | | |
|---|---|---|---|
| 3,729,074 | 4/1973 | Anderson et al. | 192/4 C |
| 4,036,330 | 7/1977 | Henning et al. | 188/72.8 |
| 4,124,084 | 11/1978 | Albright et al. | 180/6.48 |
| 4,892,173 | 1/1990 | Harrison | 188/73.44 |
| 5,363,944 | 11/1994 | Thiel et al. | 188/73.31 |
| 5,485,899 | 1/1996 | Thiel et al. | 188/73.1 |
| 5,551,538 | 9/1996 | Null | 188/112 R |

*Primary Examiner*—Christopher P. Schwartz
*Assistant Examiner*—Jeffrey Woller
*Attorney, Agent, or Firm*—Low and Low

[57] ABSTRACT

An externally mounted bracket system for disc brakes, as especially associated with the drive trains of heavy duty vehicles, wherein a generally T-shaped bracket plate may be secured to the housing of either a transmission or a rear axle, and a fluid pressure brake cylinder and associated braking calipers are mounted to the bracket plate, whereby the bracket system is readily installed adjacent a rotor disc, and is easily accessible for adjustment or repair.

4 Claims, 3 Drawing Sheets

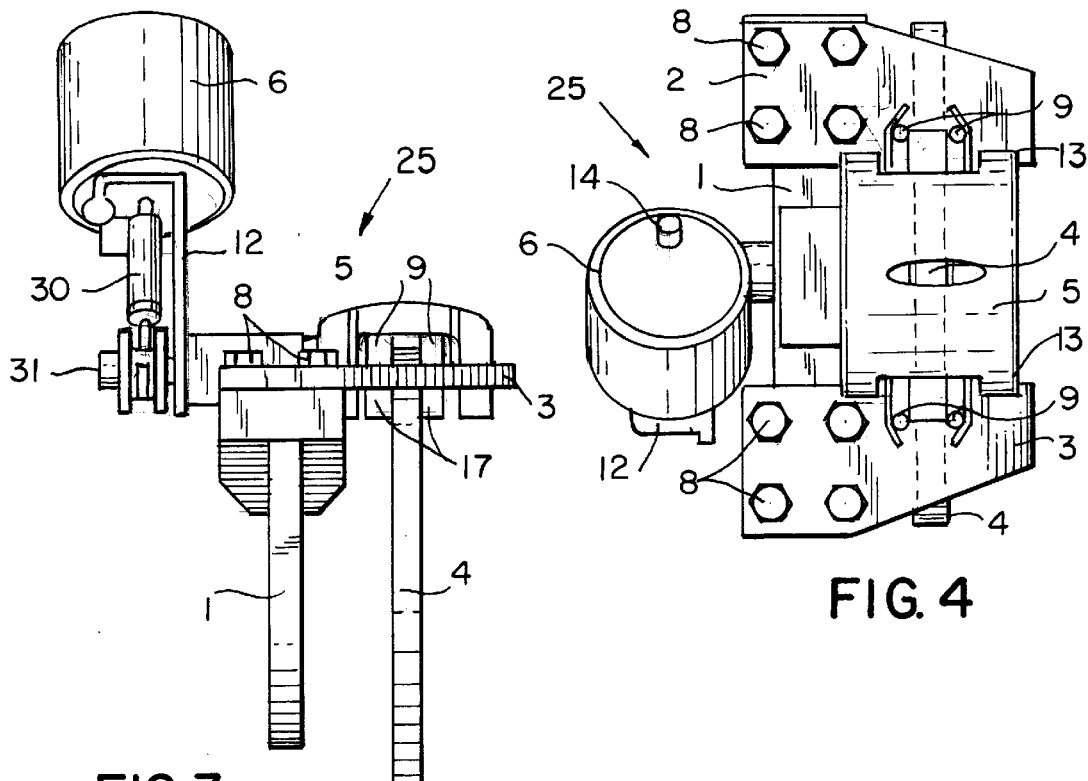
FIG. 3
FIG. 4
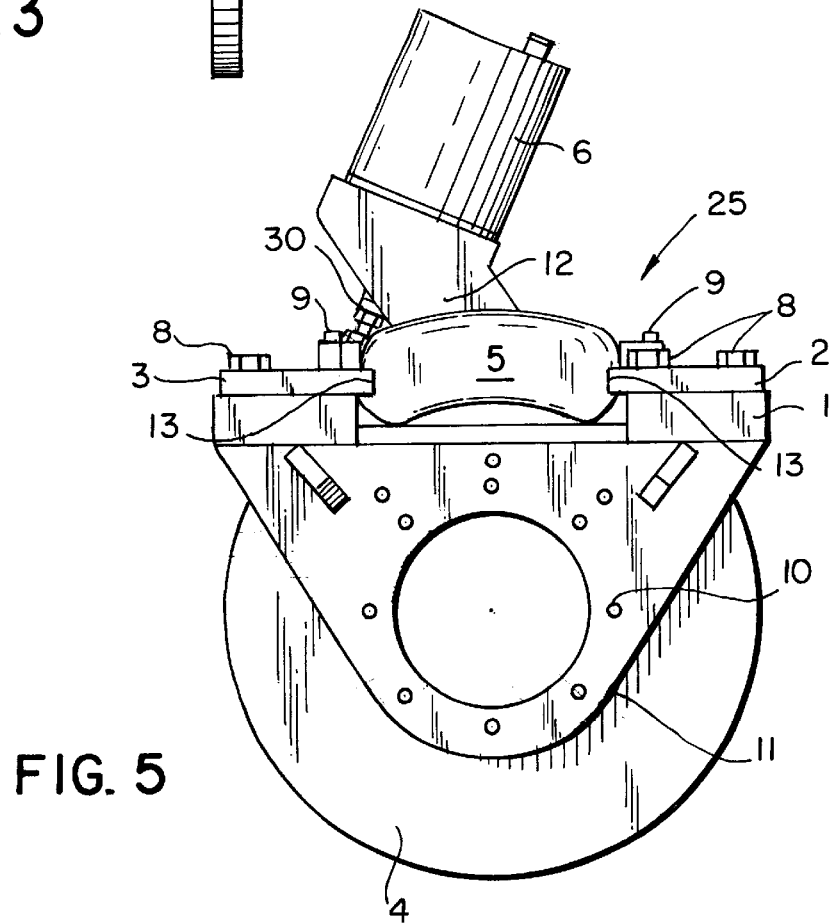
FIG. 5

EXTERNALLY MOUNTED BRACKET SYSTEM FOR DISC BRAKES

BACKGROUND OF THE INVENTION

This invention relates to brake assemblies for motor vehicles, especially of the very large type which are used in surface mines to haul heavy loads of coal or other material.

BRIEF SUMMARY OF THE INVENTION

This invention relates to brake assemblies for motor vehicles. In particular, it is especially adapted for heavy mine truck parking brakes.

As will be seen, the device is designed to bolt to a rear axle of a truck or the truck transmission. In so doing, a unique bracket system is secured to either the transmission housing or the axle housing, wherein the drive line extends through a bracket plate and also carries a brake disc. The bracket further includes mounting pads at the top for a fluid pressure brake unit including brake calipers for acting on the disc.

BRIEF DESCRIPTION OF THE DRAWINGS

FIG. 3 is another view of the invention in side elevation with associated parts not shown for clarity.

FIG. 4 is a top view of the device of this invention.

FIG. 5 is a elevation of the device taken from the right end of FIG. 2.

DETAILED DESCRIPTION OF PREFERRED EMBODIMENTS

Figure 1:
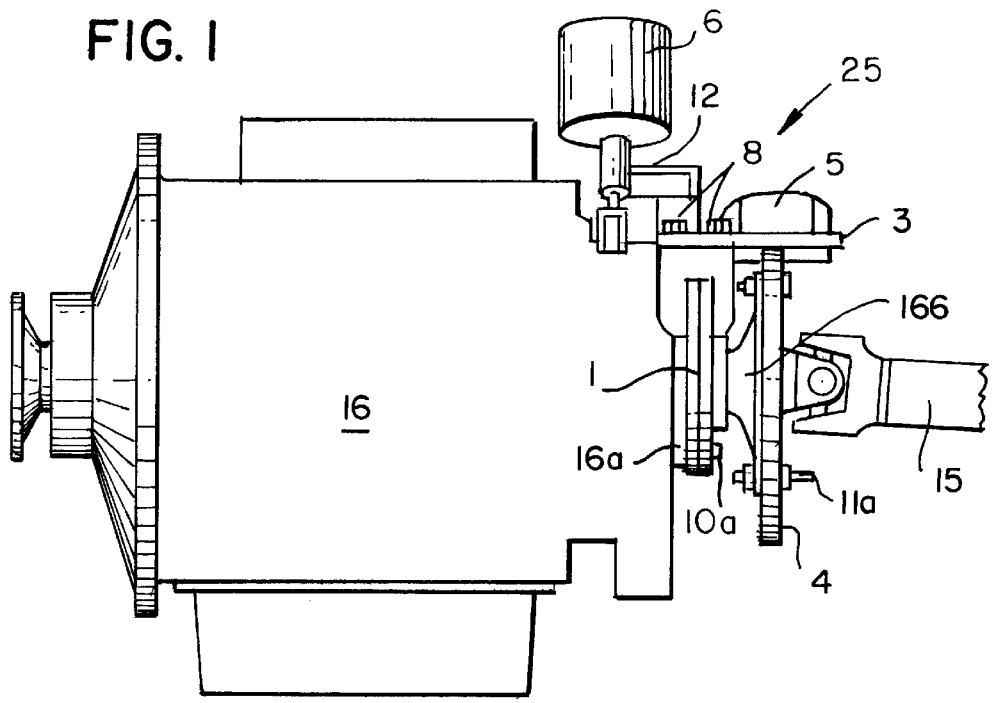
FIG. 1 is a side elevational view of the invention applied to a truck drive train.

FIG. 1 illustrates certain major components of the drive train of a truck. As indicated, this invention can be used not only with heavy trucks, but virtually any type of vehicle having the essentials of this drive train or one similar to it.

In FIG. 1, 16 is the transmission which, via means to be described, connects with the vehicle drive train 15. In the drawing, an Allison transmission is shown.

Figure 2:
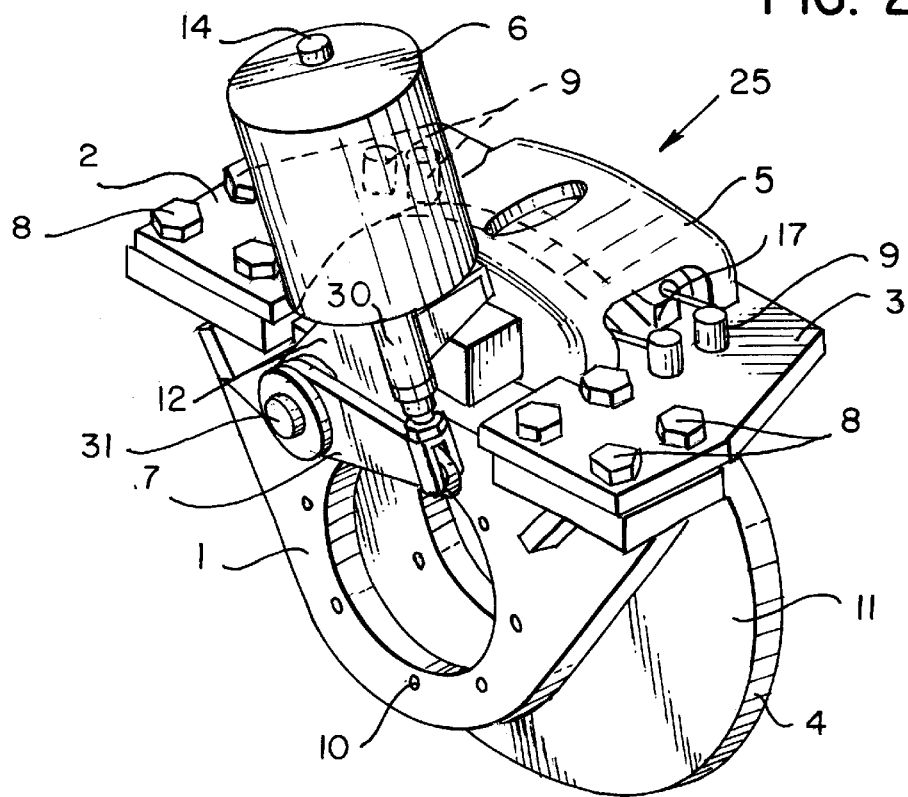
FIG. 2 is a perspective view showing elements of the brake assembly in greater detail than in FIG. 1.

The bracket system of the invention includes a main bracket 1, as well shown in FIG. 2 and top bracket 2 and 3. The bracket is generally T-shaped, including a depending plate having an aperture through which the drive train extends, and short top mounting pads generally perpendicular thereto.

The brackets are attached to the housing of a transmission 16 or a rear axle 18. Bracket 1 may be adjusted via rotation to any position allowable by the pattern of bolt holes 10 (or the holes can be drilled for custom fitting) and clearance envelops so that bracket 1 can be bolted to transmission tall shaft housing 16a, as shown in FIG. 1, using bolts 10 a.

Note that bracket 1 mounting holes 10 permit it to be attached to a rear axle or transmission. Bracket 1 is independent of both the transmission or rear axle and functions to connect the disc brake assembly. (For this purpose, rotor 4 is not defined as part of the brake assembly.)

One key advantage is that the bracket 1 permits the use of disc brakes in vehicles, particularly heavy trucks, such as mine trucks. Such trucks historically have been equipped with drum brakes and my bracket 1 makes it possible to use a disc brake in lieu of drum brakes and to connect the disc brake to either the transmission or rear axle.

Another advantage is that rear axles traditionally have used drum brakes, so my bracket 1 makes it possible to use a disc brake in lieu of such older drum brakes.

Also, my bracket can be modified to accept disc brake assemblies having two sets of brake pads where that is desired.

There is shown disc brake rotor 4 which is attached to the truck drive shaft 15 and which rotates with it. Rotor 4 is bolted to drive line flange 16b using bolts 11a.

The device includes a brake caliper assembly 5, an actuator 6 (also known as a brake chamber) and an actuator bracket 12 which attaches to the caliper assembly 5. Actuator 6 has an air or oil connection 14. Caliper assembly includes a brake pad 17 on either side of rotor 4.

As is well known in the art, brake pads 17 move to clamp rotor 4 to stop the vehicle. Brake pad return springs 9 function to keep the pads away from the rotor when the brake is not in use.

Also shown is a slack adjuster 7. The later is manually operated and can be adjusted to compensate for brake pad wear.

As best shown in FIG. 5, the device includes slot-like mortises 13 in caliper 5 that slide on short bracket plates 2 and 3 respectively having edges that confront the mortise slots. Bracket plates 2 and 3 are maintained in place by fasteners 8 and are bolted to the top mounting pads of bracket 1. If desired, bracket 1 can have threaded holes for this purpose.

When the vehicle is to be parked, air or oil are evacuated from the actuating chamber 6, allowing a spring within the chamber to clamp the brake pads 17 against the rotor 4. This prevents the driveline 15 from rotating and hence the vehicle from moving.

It should be kept in mind that brackets 1, 2 and 3 can be made in virtually any desired shape in order to fit with different types of transmissions and/or axles.

When the vehicle is being driven, air or hydraulic pressure is constantly being applied within actuator 6, opposing the pressure of a large and powerful spring (not shown) which is also located within actuator 6.

A diaphragm (not shown) within actuator 6 separates a spring chamber and an air chamber (not shown) in actuator 6. The air or oil pressure pushes the rod 30 connecting the actuator 6 to the slack adjuster 7. The latter rotates on a camshaft 31 which is threaded inside the caliper assembly and can move in a direction for and aft and perpendicularly to bracket 1. This pressure and mechanical action keep the brake pads 17 away from rotor 4, which is rotating with the driveline when the vehicle is in motion.

When the vehicle is parked, the air or oil in the actuator 6 is exhausted and the spring (not shown) pressure revolves the slack adjuster 7 and camshaft in the opposite direction, applying the brake pads 17 to the now stationary rotor. This powerful clamping force prevents rotation of the rotor and driveline, preventing vehicle movement.

The caliper assembly 5 is free to move within the limitation of the brake pad springs 9 which are rotary springs mounted on brackets 2 and 3. Bolts go through the centers of springs 9 and into the threaded holes in brackets 2 and 3.

As mentioned, the caliper assembly 5 is equipped with mortises 13 in each side which allow it to move in a direction for and aft and perpendicularly to bracket 1. The brake pad springs 9 keep the caliper assembly centered on the rotor and keep the brake pads 17 away from the spinning rotor 4 when the vehicle is being driven.

Figure 6:
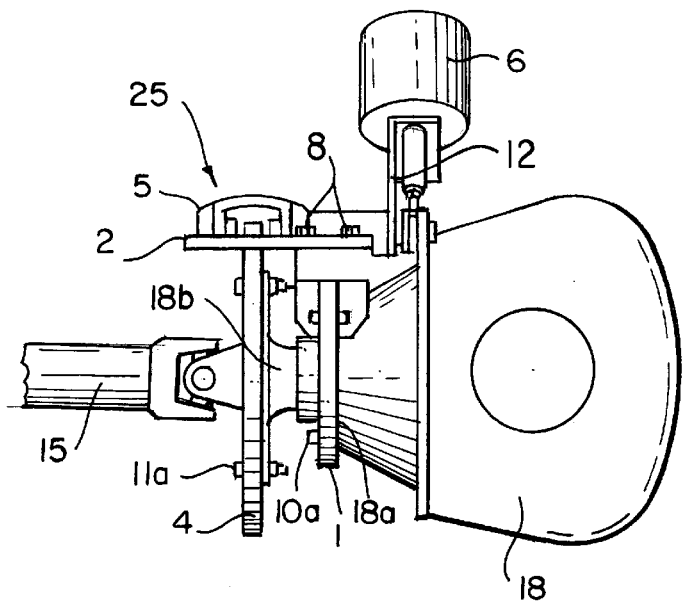
FIG. 6 is a side elevational view of a truck rear axle with the device of this invention attached to it.
Figure 7:
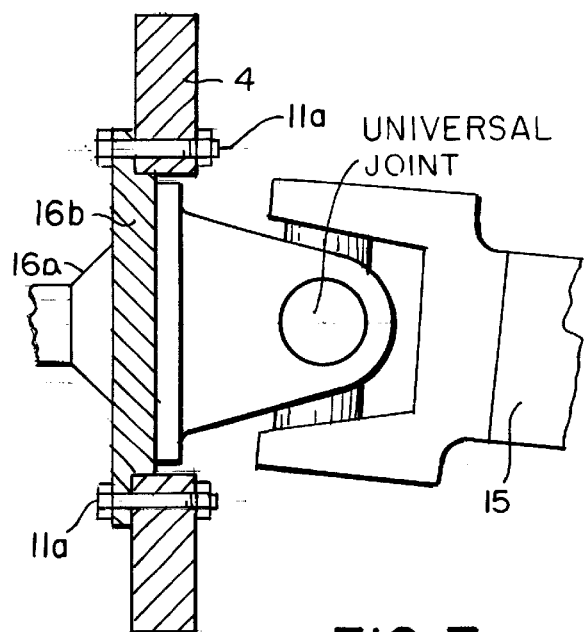
FIG. 7 is an view of certain elements shown in FIG. 1, enlarged for clarity.

FIG. 6 illustrates the invention applied to the axle 18 of a vehicle, such as a truck. Like parts have the same numerating as in the foregoing drawings.

Figure 8:
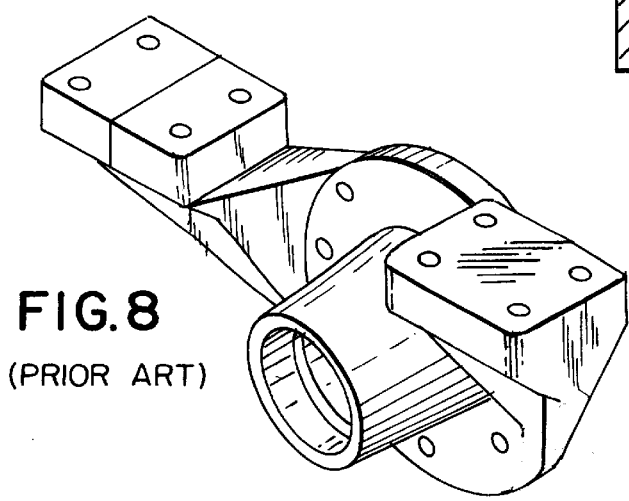
FIG. 8 illustrates a bracket of the prior art.

FIG. 8 illustrates a bracket of the prior art.

I claim:

1. A bracket system for mounting a disc braking assembly on the drive lines of heavy duty motor vehicles of two differing types, namely:
   (a) a first type having a transmission housing provided with a mount surrounding the drive line, with said mount having a circular series of bolt holes, and wherein a brake rotor is affixed to the drive line adjacent said transmission housing thereat; and also,
   (b) a second type having an axle housing provided with a mount surrounding the drive line, with said mount having a circular series of bolt holes, and wherein a brake rotor is affixed to the drive line adjacent said axle housing thereat;
   wherein said bracket system includes:
      (a) a generally planar bracket plate having an aperture therethrough for the drive train of a vehicle, and wherein further said plate has a circular series of bolt holes surrounding said aperture, and,
      (b) said bracket plate having means for receiving, mounting, and supporting a braking assembly thereon for cooperation with the brake rotor;
   said series of bolt holes on said bracket plate permitting relative rotational positioning thereof with respect to the bolt holes of the said transmission mount of said first type of motor vehicles, and also permitting relative rotational positioning thereof with respect to the bolt holes of the said axle housing mount of said second type of motor vehicles, thereby to align the holes as necessary to mount the said bracket system on said first type of motor vehicles and on said second type of motor vehicles.

2. The bracket system for mounting a disc braking assembly on heavy duty motor vehicles of two differing types as in claim 1, wherein:
   said means for mounting a braking assembly on said bracket includes a pair of spaced mounting pads affixed to said bracket plate, with said pads being disposed substantially perpendicularly to said bracket plate, and,
   a pair of top bracket plates respectively secured to said mounting pads for engaging and retaining said braking assembly on said bracket plate.

3. The bracket system for mounting a disc braking assembly on heavy duty motor vehicles of two differing types as in claim 2, wherein said top bracket retaining plates are bolted to said mounting pads.

4. The bracket system for mounting a disc braking assembly on heavy duty motor vehicles of two differing types as in claim 3, wherein said top bracket retaining plates have spaced confronting parallel edges for engaging said braking assembly on either side thereof and to permit relative sliding motion between said braking assembly and said confronting plate edges until said top bracket plates are tightly bolted to said mounting pads, thereby to permit desired positioning of said braking assembly with respect to said vehicle brake rotor prior to bolting and retaining of said top plates on said mounting pads.

* * * * *